(12) United States Patent
Roald et al.

(10) Patent No.: US 12,359,746 B2
(45) Date of Patent: Jul. 15, 2025

(54) SYSTEM AND METHOD FOR DETECTING SAFE OPERATING CONDITIONS AND MAINTAINED INTEGRITY IN A PRESSURE SAFETY VALVE

(71) Applicant: Ideation AS, Hovik (NO)

(72) Inventors: Arne Ole Roald, Jar (NO); Knut Are Dyrdal, Bekkjarvik (NO)

(73) Assignee: Ideation AS, Høvik (NO)

( * ) Notice: Subject to any disclaimer, the term of this patent is extended or adjusted under 35 U.S.C. 154(b) by 1034 days.

(21) Appl. No.: 17/310,049

(22) PCT Filed: Jan. 16, 2020

(86) PCT No.: PCT/NO2020/050006
§ 371 (c)(1),
(2) Date: Jul. 13, 2021

(87) PCT Pub. No.: WO2020/149748
PCT Pub. Date: Jul. 23, 2020

(65) Prior Publication Data
US 2022/0034416 A1     Feb. 3, 2022

(30) Foreign Application Priority Data

Jan. 16, 2019   (NO) .................................. 20190050

(51) Int. Cl.
*F16K 37/00*       (2006.01)
*F16K 17/04*       (2006.01)
*F16K 17/08*       (2006.01)

(52) U.S. Cl.
CPC ........ *F16K 37/0091* (2013.01); *F16K 17/048* (2013.01); *F16K 17/082* (2013.01);
(Continued)

(58) Field of Classification Search
CPC .. F16K 17/048; F16K 17/082; F16K 17/0025; F16K 17/0033; F16K 17/0041; F16K 17/0058
See application file for complete search history.

(56) References Cited

U.S. PATENT DOCUMENTS

2002/0029808 A1\* 3/2002 Friend ..................... F16K 17/06
137/551
2008/0308157 A1   12/2008 Zhuang
(Continued)

FOREIGN PATENT DOCUMENTS

DE         2528244 A1    12/1976
JP    2008133739 A  \*  6/2008
(Continued)

OTHER PUBLICATIONS

Norwegian Patent Office; Search Report for Application No. 20190934, dated Mar. 4, 2020 (2 pages).
(Continued)

*Primary Examiner* — Atif H Chaudry
(74) *Attorney, Agent, or Firm* — Nixon Peabody LLP

(57) ABSTRACT

A system for detecting safe operating conditions and maintained integrity in a Pressure Safety Valve (PSV) the valve comprising an inlet, an outlet, a valve disc controlling fluid flow between the inlet and outlet, a stem connected to the valve disc, a spring washer, and a spring in communication with the valve disc and the spring washer, a vibration sensor which detects vibration in the valve disc, an inlet pressure sensor which detects the static pressure in the inlet, a position sensor which detects the position of the valve disc transferred through the stem, a compression load cell sensor which detects the dynamic force applied on the valve spring washer by the spring, an outlet pressure sensor which detects the pressure in the outlet, a separate shock sensor adapted to (Continued)

determine if the PSV has popped and then activate a microcontroller.

41 Claims, 3 Drawing Sheets

(52) U.S. Cl.
CPC ...... *F16K 37/0033* (2013.01); *F16K 37/0058* (2013.01); *F16K 37/0083* (2013.01)

(56) References Cited

U.S. PATENT DOCUMENTS

| | | |
|---|---|---|
| 2009/0000406 A1 | 1/2009 | Brazier |
| 2010/0305883 A1 | 12/2010 | Danzy |
| 2018/0073659 A1 | 3/2018 | Tiffany, III |
| 2018/0339849 A1 | 11/2018 | Tiffany, III |

FOREIGN PATENT DOCUMENTS

| | | | |
|---|---|---|---|
| KR | 20170061975 A | * | 6/2017 |
| WO | WO 2007/107725 A1 | | 9/2007 |
| WO | WO 2018/193060 A1 | | 10/2018 |

OTHER PUBLICATIONS

Li J et al.; "Multi-objective Design Optimization of a Pressure Safety Valve for Rapid Opening and Reclosing"; Procedia Engineering, vol. 130, sides 113-124; 2015; ISSN: 1877-7058 (12 pages).

International Search Report and Written Opinion of International Searching Authority for International Application No. PCT/NO2020/050006, mailed May 12, 2020 (10 pages).

* cited by examiner

SYSTEM AND METHOD FOR DETECTING SAFE OPERATING CONDITIONS AND MAINTAINED INTEGRITY IN A PRESSURE SAFETY VALVE

CROSS-REFERENCE TO RELATED APPLICATIONS

This application is a U.S. National Stage of International Application No. PCT/NO2020/050006, filed Jan. 16, 2020, which claims priority to and the benefit of Norwegian application No. 20190050, filed Jan. 16, 2019, both of which are incorporated by reference in their entirety.

FIELD OF THE INVENTION

The present invention relates to a system and method for detecting safe operating conditions and maintained integrity in Pressure Safety Valves.

BACKGROUND OF THE INVENTION

A Pressure Safety Valve (PSV) is used to protect a process system against overpressure. FIG. 1 indicates a closed PSV to the left when the process pressure is below the PSV set pressure which is normally the same as the process design pressure for the process system, and to the right a reliving PSV where the process pressure is higher than the PSV set pressure and the PSV open to allow process medium to flow out of the system.

A typical PSV is a direct spring-loaded relief valve characterized by rapid opening or pop action when subjected to an upstream pressure above the PSV set pressure.

PSVs are used in a variety of industrial application to safeguard process equipment for exposure of internal pressures exceeding the equipment design pressure. One industrial application where PSVs are used is within the oil and gas industry. Each plant may have from hundreds to thousands of installed PSVs. Consequences of a fault on any one PSV ranges from hazardous explosions and fire to releases of hydro carbon and other toxic gases to atmosphere.

Maintenance of PSVs is of major importance to the economy in the operation. In the maintenance context, it is distinguished between (Ref. NORSOK Z008 and others): "corrective maintenance" where the equipment is run to failure, "preventive maintenance" where maintenance of the equipment is performed at predefined (planned) intervals and "condition-based maintenance" where maintenance is performed based on measurements of equipment condition and performance.

PSVs are normally maintained on predefined intervals in the class of "preventive maintenance". The intervals range from 1 year to 6 years typically with an average of 2 years in the Norwegian oil and gas industry. Records shows that faults recorded during maintenance of PSVs are typically 2 to 4% of tested units in the period 2005 to 2015, example for 2015 where 12160 PSVs were tested and 322 reported with faults (Ref Petroleumtilsynet report "Risikoniva i petroleumsvirksomheten, Hovedrapport, utviklingstrekk 2015, norsk sokkel"). Reducing the maintenance time and costs associated with maintaining PSVs can have a large impact on the plant maintenance cost.

Current approaches in monitoring PSVs with accelerometers and vibration detectors have issues with respect to effectiveness and accuracy. For example, many of the current approaches in monitoring PSVs generate nuisance alarms due to acoustic noise sources such as turbulence created from work in the area, steam whistles or ambient plant noise. Other PSV monitoring systems include continuous on-line monitoring connected to the plant monitoring system, which create huge amount of data to be analysed and evaluated, which has proved to create costly installations and require specialised personnel to maintain and extract the data for the PSV maintenance process.

SUMMARY OF THE INVENTION

The main objective of the invention is to provide a system and method to detect abnormal operating conditions which will influence functional safety for a Pressure Safety Valve (PSV).

It is further an objective of the invention to provide a method and system to reduce maintenance work and operating cost for the PSV.

It is further an objective of the invention to provide a method and system to determine when the PSV deviates from the acceptable operating specification by leaking process medium and quantify the leak rate per unit time.

It is further an objective of the invention to provide a system and method to quantify the release rate per unit time of process medium when the PSV open to process pressure exceeding the PSV set pressure and check if the flowrate deviates from acceptable design operating process variable envelope.

It is further an objective of the invention to provide a method to determine when the valve dynamic movement envelope is changed due to corrosion, deposits, wear and tear of the mechanical parts of the PSV.

It is further an objective of the invention to provide a system and method to determine when the inlet process pressure acting on the PSV disc is higher than the PSV set pressure without a correct PSV pop action.

It is further an objective of the invention to generate and store defined abnormal condition messages in real time in the local Predictor microcontroller and transmit the messages wireless as required by external operational data systems.

These objectives are achieved with the method and system of the present invention as set forth in the appended claims.

BRIEF DESCRIPTION OF THE DRAWINGS

The invention will now be described in reference to the appended drawings, in which.

DETAILED DESCRIPTION OF THE INVENTION

At least one embodiment of the present invention is described below in reference to the operation of a Pressure Safety Valve (PSV 1) within an oil and gas production plant.

However, it should be apparent to those skilled in the art and guided by the teaching herein that the present invention is likewise applicable to any industrial facility that may employ PSVs. A non-exhaustive listing of possible industrial facilities that employ PSVs and have a need to monitor such valves includes power generation plants, chemical facilities and electrical facilities. Those skilled in the art will further recognize that the teaching herein are suited to other applications in addition to industrial settings such as for example military, commercial and residential applications.

Figure 1:
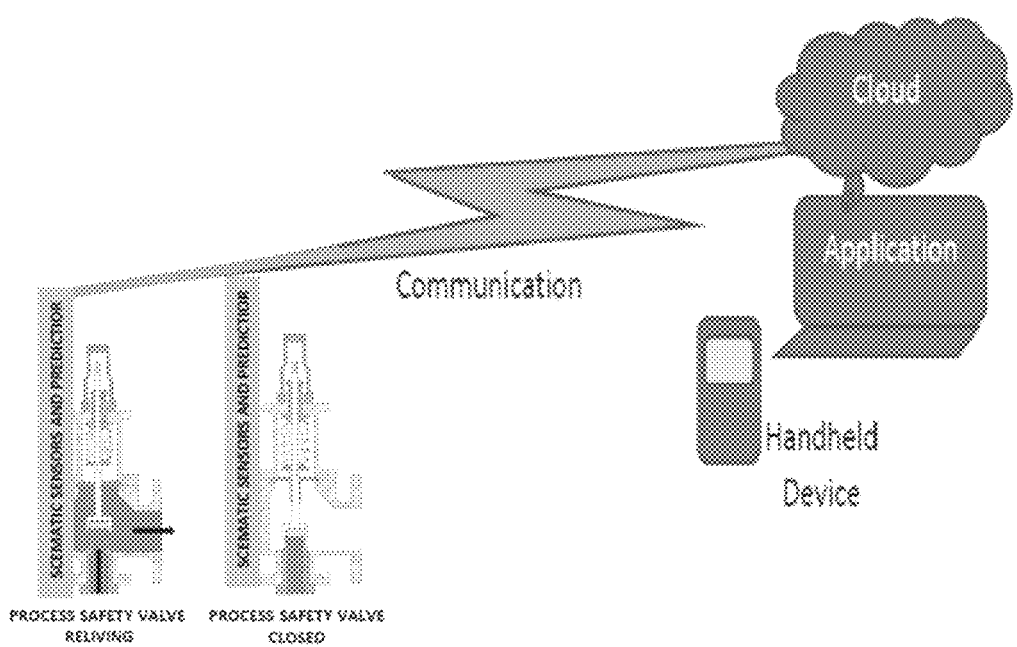
FIG. 1 is a schematic illustration of a PSV monitoring system for abnormal condition detection depicting the communication as a generic symbol, achieved either over a Wi-Fi network, Bluetooth protocol, SMS protocol, or any other applicable method according to one embodiment of the present invention.

Referring to the drawings FIG. 1 is a schematic illustration of a PSV 1 with monitoring system for abnormal situation detection depicting the communication as a generic symbol, achieved either over a Wi-Fi network, Bluetooth protocol, SMS protocol (a Cloud, dedicated Application or a Handheld Device), or any other applicable method according to one embodiment of the present invention. The PSVs with sensors and the Predictor is adapted to communicate with different recipients.

Figure 2:
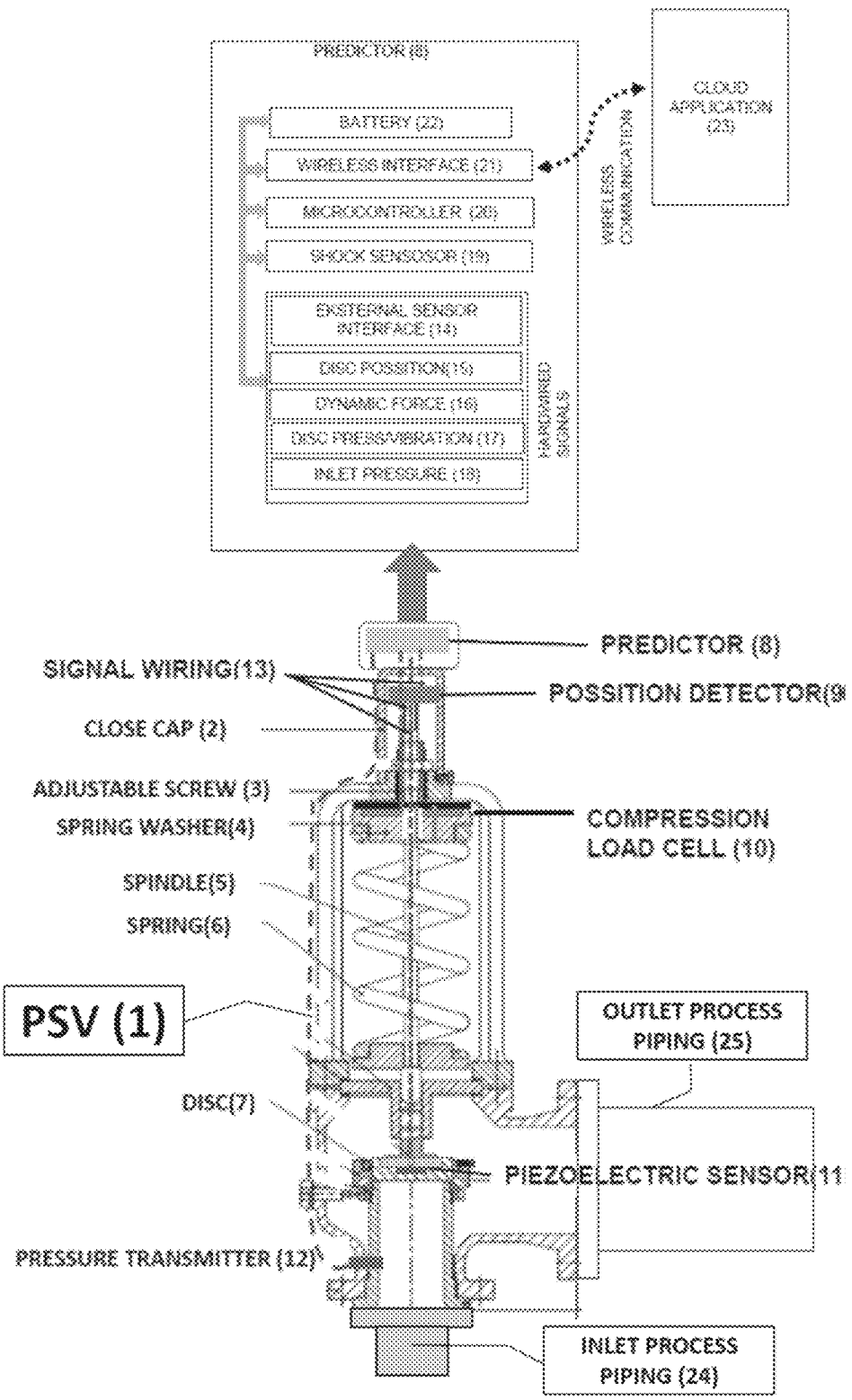
FIG. 2 is a schematic illustration of a Pressure Safety Valve with relevant components according to one embodiment of the present invention.

FIG. 2 is a sectional view through a PSV equipped with sensors according to the present invention. The PSV as such includes a housing with an inlet and outlet. The fluid flow between the inlet and outlet is controlled by and normally closed by a disc 7. The disc 7 is connected to an elongated stem or spindle 5. The spring 6 is connected to the stem 5 by a spring washer 4, the disc 7 onto a valve seat closing the inlet, and with an adjustable screw 3 allowing the position of the spring washer 4 on the stem 5 to be adjusted, thus controlling the closure force acting on the disc 7. The PSV further includes a predictor S interfacing the sensors of the PSV to the communication means, here a wireless interface 21. The predictor 8 also includes a microcontroller 20 connected to a shock sensor 19 and an external sensor interface 14. The microcontroller 20 is powered by a battery 22.

FIG. 2 shows the details where at least one predictor 8, fixed on top of PSV 1 monitor and record if the PSV 1 sticks in closed position or is worn by wear and tear and/or leaks and/or open or pop at a calibrated inlet pressure set, where at least one position detector 9 measures the disc 7 position transferred through the stem 5 and at least one compression load cell 10 measures the dynamic force applied on the valve spring washer 4 by the spring 6 and at least one piezoelectric sensor 11 measures the dynamic pressure in the inlet process piping 24 and the vibrations in the disc 7 and/or at least one pressure transmitter 12 also measures the said pressure in the inlet process piping 24, where the sensors 9, 10, 11, and 12 are wired 13 into the external sensor interface 14 which is controlled by the microcontroller 20 and measure the disc position 15, and the spring dynamic force 16, and the inlet pressure and/or disc vibrations 17, and/or the inlet pressure 18, which together is the Dynamic Movement Data Set (DMDS) 116 for PSV 1.

Figure 3:
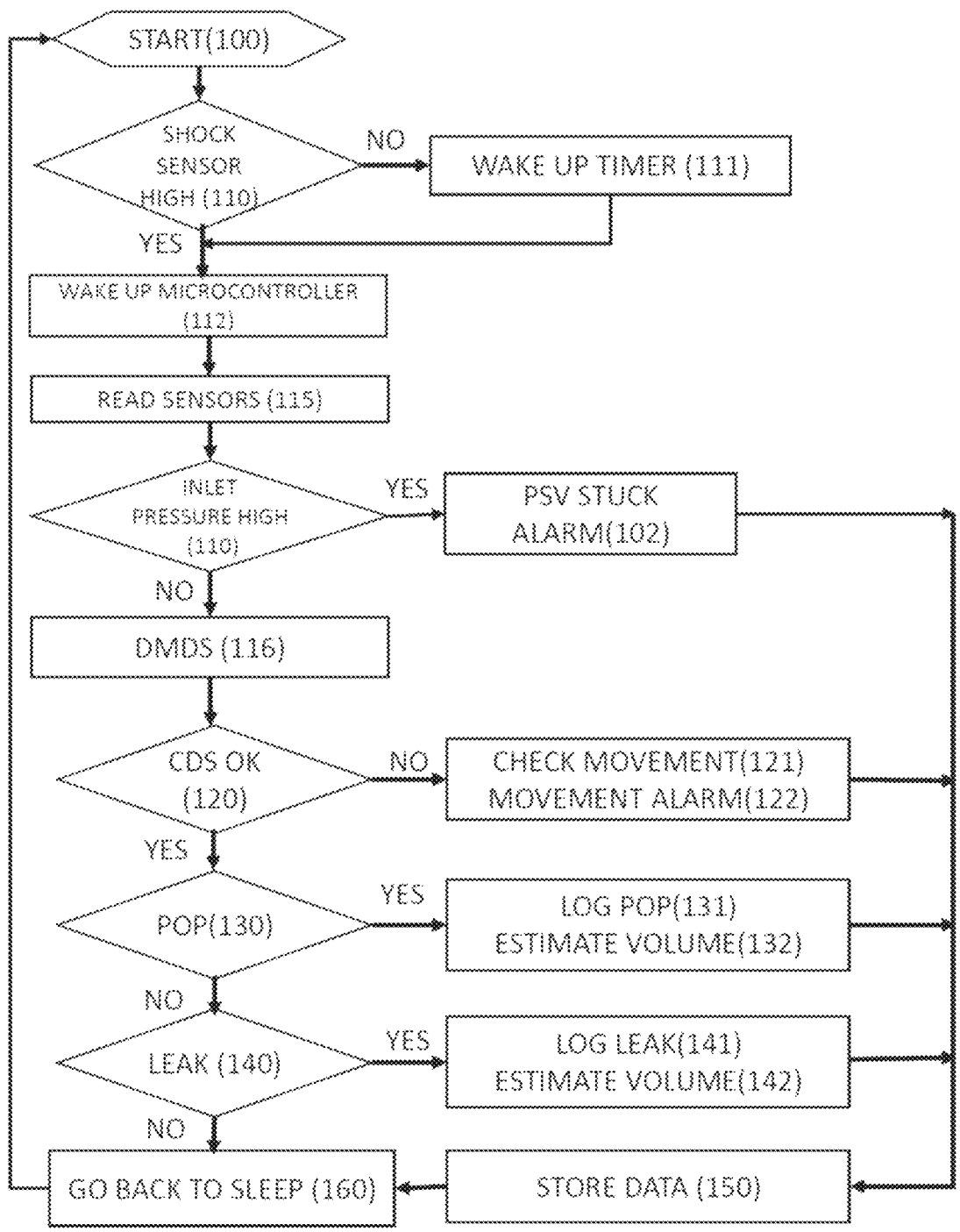
FIG. 3 is a data flow chart associated with PSV 1 abnormal condition detection according to one embodiment of the present invention.

FIG. 3, shows the illustration of the program steps for the said microcontroller 20, where Start 100 is the initial sleep mode state of the microcontroller 20, when vibrations generated by process flow through the PSV 1 generate sufficient vibrations to activate at least one shock sensor 19 installed in the Predictor 8 and/or at least one compression load cell 10 and/or at least one piezoelectric pressure sensor 11 which will generate an electric activation signal 110 and wake up the microcontroller (step 112 wake up). The system also includes a wake-up timer that is adapted to initiate a wake-up routine (step 111) at even selectable intervals.

When awake, the microcontroller 20 read sensor data, step 115, from the sensors 9, 10, 11, and initiate a procedure 110 where the inlet pressure 18 is compared with the set pressure for the PSV 1. If the pressure in the inlet process piping 24 is in excess of the set pressure the PSV is stuck, whereby the microcontroller 20 generates a PSV 1 Stuck alarm message. This message is communicated to external operational data systems and stored with real time in the microcontroller 150, and the microcontroller 20 goes back to sleep mode 160 and return to Start 100.

If the pressure in the inlet process piping does not exceed the set PSV pressure, the microprocessor will continue to step 116 and compute the Dynamic Movement Data Set, which is time series of frequency spectrum with amplitude generated from the said signals from the disc position 15, and the spring dynamic force 16, and the inlet pressure disc vibrations 17 and the inlet pressure 18 for a defined time interval for PSV 1 to check for stiction, friction, wear and tear by comparing the Dynamic Movement Data Set 116 with the PSV 1 Condition Data Set 120 (CDS) defined as acceptable stiction, friction, and movement characteristic for the PSV 1 to be in good working condition or not, stored in the microcontroller 19.

If the recorded Dynamic Movement Data Set 116 is outside the acceptance range of the Condition Data Set 120 a message Check Movement 121 and Movement Alarm 122 is generated, communicated to external operational data systems and stored with real time in the microcontroller 150, and the microcontroller 20 goes back to sleep mode 160, but if the recorded Dynamic Movement Data Set 116 conform with the Condition Data Set 120, the PSV 1 is in good working condition, and the microcontroller 20 check the recorded Dynamic Movement Data Set 116 against the PSV 1 pop algorithm, step 130, which define the fast opening and discharge flow characteristic for PSV 1, were the pop action can be the cause of the generated wake up 112 (check for pop), of the PSV 1, and if the PSV 1 has popped and the movement data set 116 conform to the stored pop algorithm 130, the microcontroller 20 log the pop movement 131, estimate the flow volume 132, communicate to external operational data systems and store the said data 150 with time information, and the microcontroller 20 goes back to sleep mode 160; and/or if the recorded Dynamic Movement Data Set 116 is outside the defined range of the pop algorithm 130, the PSV 1 has not popped, and the microcontroller 20 check the recorded Dynamic Movement Data Set 116 against the PSV 1 leak algorithm, step 140, which define the characteristic of a small leak flow for PSV 1, were the leak 140 action can be the cause of the generated wake up 112, of the PSV 1, (check for leak) and if the dynamic movement data set 116 conform to the stored leak 140 algorithm the PSV 1 leaks, and the microcontroller 20 log the leak 141, estimate the leak flow volume 142, and store the data 150 with real time information, and the microcontroller 20 goes back to sleep mode 160; and/or if the recorded Dynamic Movement Data Set 116 is outside the defined range of the Leak 140 algorithm, the PSV 1 is not leaking and go back to sleep 160, and wait for the above cycles from 112 to 150 is repeated by either the action of the shock sensor 110 or the wake up timer 111 where the wake up timer 111 is set by operational procedures to typically between 1 hour to 24 hours.

The system may also include an additional pressure sensor (not shown) measuring the pressure in the outlet. Then, a more accurate estimate of the flow rate through the valve may be obtained by determining the pressure differential over the valve (from readings of the pressures in the inlet and outlet), when the size of the opening of the valve is known.

The invention claimed is:

1. A system for detecting safe operating conditions in a pressure safety valve, comprising:
an inlet and an outlet;
a valve disc controlling fluid flow between the inlet and the outlet;
a stem connected to the valve disc;
a spring washer and a spring in communication with the valve disc and the spring washer;
a position sensor for detecting the position of the valve disc via the stem;
a vibration sensor for detecting vibration in the valve disc;
an inlet pressure sensor for detecting the static pressure in the inlet; and
a microcontroller in communication with the position sensor, the vibration sensor, and the inlet pressure sensor; and
wherein the microcontroller computes a time series of frequency magnitudes based on sensed data from at least one of the vibration sensor and the inlet pressure sensor and, in response to the sensed data, generates operating-condition output data.

2. A system according to claim 1, further including a compression load cell sensor for detecting the dynamic force applied on the valve spring washer by the spring.

3. A system according to claim 2, further including an outlet pressure sensor for detecting the pressure in the outlet.

4. A system according to claim 1, further including an outlet pressure sensor for detecting the pressure in the outlet.

5. A system according to claim 1, wherein, in response to the microcontroller reading an inlet pressure from the inlet pressure sensor that is above a threshold pressure, the microcontroller generates a valve-stuck alarm message.

6. A system according to claim 1, wherein the microcontroller computes the time series of frequency magnitudes based on sensed data from the vibration sensor and the inlet pressure sensor, and
wherein, in response to the computed time series of frequency magnitudes being outside of predefined range, the microcontroller generates a check-movement message, the operating-condition output data including the check-movement message.

7. A system according to claim 6, wherein, in response to the computed time series of frequency magnitudes being outside of predefined range, the microcontroller generates a movement alarm, the operating-condition output data including the movement alarm.

8. A system according to claim 1, wherein the microcontroller computes the time series of frequency magnitudes based on data read from the vibration sensor and the inlet pressure sensor, and
wherein in response to the computed time series of frequency magnitudes conforming to a corresponding stored pop data set reflecting a fast opening of the valve outside of predefined range, the microcontroller generates an estimate of a flow volume, the operating-condition output data including the estimate of flow volume.

9. A system according to claim 8, wherein in response to the computed time series of frequency magnitudes conforming to a corresponding stored pop data set reflecting a fast opening of the valve outside of predefined range, the microcontroller generates a log that a pop has occurred, the operating-condition output data including the log.

10. A system according to claim 1, wherein the microcontroller computes the time series of frequency magnitudes based on data read from the vibration sensor, and
wherein in response to the computed time series of frequency magnitudes conforming to a corresponding stored leak data set of time series of frequency magnitudes reflecting a leaky valve, the microcontroller generates an estimate of a leak flow volume, the operating-condition output data including the estimate of leak flow volume.

11. A system according to claim 10, wherein in response to the computed time series of frequency magnitudes conforming to a corresponding stored leak data set of time series of frequency magnitudes reflecting a leaky valve, the microcontroller generates a log that a valve is leaking, the operating-condition output data including the log.

12. A method for detecting safe operating conditions in a pressure safety valve, the pressure safety valve including an inlet and an outlet, a valve disc controlling fluid flow between the inlet and the outlet, a position sensor for detecting the position of the valve disc, a vibration sensor for detecting vibration in the valve disc, and an inlet pressure sensor for detecting the inlet pressure in the inlet, the method comprising:
a) comparing the inlet pressure with a predefined value, and if the inlet pressure is above the predefined value,
generating a valve-stuck alarm,
storing sensor data, and
terminating the method;
b) if the inlet pressure is below the predefined value, computing a time series of frequency magnitudes for sensor data from the vibration sensor and inlet pressure sensor, and comparing the computed time series of frequency magnitudes with a corresponding stored condition data set of time series of frequency magnitudes, and if the computed time series of frequency magnitudes is outside of an acceptable range:
generating a check-movement alarm,
storing sensor data, and
terminating the method;
c) if the computed time series of frequency magnitudes is within the acceptable range, comparing the time series of frequency magnitudes with a corresponding stored pop data set of time series of frequency magnitudes reflecting a fast opening of the valve, and if the computed time series of frequency magnitudes conforms to the stored pop data set:
estimating a flow volume through the valve,
logging that a pop has occurred,
storing sensor data and the flow volume, and
terminating the procedure;
d) if the computed time series of frequency magnitudes does not conform to the stored pop data set, comparing the time series of frequency magnitudes for the vibration sensor with a corresponding stored leak data set of time series of frequency magnitudes reflecting a leaky valve, and if the time series of frequency magnitudes for the vibration sensor conforms to the stored leak data set:
estimating leak flow volume through the valve,
logging that the valve is leaking,
storing sensor data and the leak flow volume, and
terminating the procedure; and
e) if the computed time series of frequency magnitudes does not conform to the stored leak data set, terminating the procedure.

13. A method according to claim 12, wherein the flow volume through the valve is estimated from the pressures read by the inlet pressure sensor and an outlet pressure sensor, and by the position of the valve.

14. A method according to claim 12, further including, comparing sensed data of a compression load cell sensor for detecting the dynamic force applied on a valve spring washer with a predefined value, and if the compression load cell sensor data is out of acceptable range, generating a check movement message and a movement alarm.

15. A method according to claim 12, wherein the pressure safety valve includes a microprocessor, the microprocessor initially being in a sleep mode, the microprocessor is activated either by detecting a certain level of vibration or by receiving a signal from a wake-up timer.

16. A method according to claim 12, further comprising communicating a message to an external system, the message being associated with one of the alarms, the logged pop, or the logged leaking valve.

17. A method for detecting safe operating conditions in a pressure safety valve, the pressure safety valve including an inlet and an outlet, a valve disc controlling fluid flow between the inlet and the outlet, a position sensor for detecting the position of the valve disc, a vibration sensor for detecting vibration in the valve disc, and an inlet pressure sensor for detecting the inlet pressure in the inlet, the method comprising:
   a) comparing the inlet pressure with a predefined value and, if the inlet pressure is above the predefined value, generating a valve-stuck alarm;
   b) computing a time series of frequency magnitudes for sensor data from the vibration sensor and inlet pressure sensor,
   c) comparing the computed time series of frequency magnitudes with a corresponding stored condition data set of time series of frequency magnitudes, and, if the computed time series of frequency magnitudes is outside of an acceptable range, generating a check-movement alarm,
   d) comparing the time series of frequency magnitudes with a corresponding stored pop data set of time series of frequency magnitudes reflecting a fast opening of the valve and, if the computed time series of frequency magnitudes conforms to the stored pop data set, developing a log that a pop has occurred; and
   e) comparing the time series of frequency magnitudes for the vibration sensor with a corresponding stored leak data set of time series of frequency magnitudes reflecting a leaky valve and, if the time series of frequency magnitudes for the vibration sensor conforms to the stored leak data set, developing a log that the valve is leaking.

18. A method according to claim 17, wherein, if the computed time series of frequency magnitudes conforms to the stored pop data set, estimating the flow volume through the valve and storing the flow volume.

19. A method according to claim 17, wherein, if the computed time series of frequency magnitudes for the vibration sensor conforms to the stored leak data set, estimating the leak flow volume through the valve and storing the leak flow volume.

20. A method according to claim 17, further comprising communicating a message to an external system, the message being associated with one of the alarms, the logged pop, or the logged leaking valve.

21. A system for detecting operating conditions in a valve, comprising:
   an inlet and an outlet;
   a valve disc controlling fluid flow between the inlet and the outlet;
   a stem connected to the valve disc;
   a biasing device in communication with the valve disc;
   a position sensor for detecting the position of the valve disc via the stem;
   a vibration sensor for detecting vibration in the valve disc;
   an inlet pressure sensor for detecting the static pressure in the inlet; and
   a microcontroller in communication with the position sensor, the vibration sensor, and the inlet pressure sensor; and
   wherein the microcontroller computes a time series of frequency magnitudes based on sensed data from at least one of the vibration sensor and the inlet pressure sensor and, in response to the sensed data, generates operating-condition output data.

22. The system according to claim 21, wherein the biasing device comprises a spring washer and a spring.

23. The system according to claim 22, further including a compression load cell sensor for detecting the dynamic force applied on the spring washer by the spring.

24. The system according to claim 23, further including an outlet pressure sensor for detecting the pressure in the outlet.

25. The system according to claim 21, further including an outlet pressure sensor for detecting the pressure in the outlet.

26. The system according to claim 21, wherein, in response to the microcontroller reading an inlet pressure from the inlet pressure sensor that is above a threshold pressure, the microcontroller generates a valve-stuck alarm message.

27. The system according to claim 21, wherein the microcontroller computes the time series of frequency magnitudes based on sensed data from the vibration sensor and the inlet pressure sensor, and
   wherein, in response to the computed time series of frequency magnitudes being outside of predefined range, the microcontroller generates a check-movement message, the operating-condition output data including the check-movement message.

28. The system according to claim 27, wherein, in response to the computed time series of frequency magnitudes being outside of predefined range, the microcontroller generates a movement alarm, the operating-condition output data including the movement alarm.

29. The system according to claim 21, wherein the microcontroller computes the time series of frequency magnitudes based on data read from the vibration sensor and the inlet pressure sensor, and
   wherein in response to the computed time series of frequency magnitudes conforming to a corresponding stored pop data set reflecting a fast opening of the valve outside of predefined range, the microcontroller generates an estimate of a flow volume, the operating-condition output data including the estimate of flow volume.

30. The system according to claim 29, wherein in response to the computed time series of frequency magnitudes conforming to a corresponding stored pop data set reflecting a fast opening of the valve outside of predefined range, the microcontroller generates a log that a pop has occurred, the operating-condition output data including the log.

31. The system according to claim 21, wherein the microcontroller computes the time series of frequency magnitudes based on data read from the vibration sensor, and
   wherein in response to the computed time series of frequency magnitudes conforming to a corresponding stored leak data set of time series of frequency magnitudes reflecting a leaky valve, the microcontroller generates an estimate of a leak flow volume, the operating-condition output data including the estimate of leak flow volume.

32. The system according to claim 31, wherein in response to the computed time series of frequency magnitudes conforming to a corresponding stored leak data set of time series of frequency magnitudes reflecting a leaky valve, the microcontroller generates a log that a valve is leaking, the operating-condition output data including the log.

33. A method for detecting operating conditions in a valve, the valve including an inlet and an outlet, a valve disc controlling fluid flow between the inlet and the outlet, a position sensor for detecting the position of the valve disc, a vibration sensor for detecting vibration in the valve disc, and an inlet pressure sensor for detecting the inlet pressure in the inlet, the method comprising:
   a) comparing the inlet pressure with a predefined value, and if the inlet pressure is above the predefined value,
      generating a valve-stuck alarm,
      storing sensor data, and
      terminating the method;
   b) if the inlet pressure is below the predefined value, computing a time series of frequency magnitudes for sensor data from the vibration sensor and inlet pressure sensor, and comparing the computed time series of frequency magnitudes with a corresponding stored condition data set of time series of frequency magnitudes, and if the computed time series of frequency magnitudes is outside of an acceptable range:
      generating a check-movement alarm,
      storing sensor data, and
      terminating the method;
   c) if the computed time series of frequency magnitudes is within the acceptable range, comparing the time series of frequency magnitudes with a corresponding stored pop data set of time series of frequency magnitudes reflecting a fast opening of the valve, and if the computed time series of frequency magnitudes conforms to the stored pop data set:
      estimating a flow volume through the valve,
      logging that a pop has occurred,
      storing sensor data and the flow volume, and
      terminating the procedure;
   d) if the computed time series of frequency magnitudes does not conform to the stored pop data set, comparing the time series of frequency magnitudes for the vibration sensor with a corresponding stored leak data set of time series of frequency magnitudes reflecting a leaky valve, and if the time series of frequency magnitudes for the vibration sensor conforms to the stored leak data set:
      estimating leak flow volume through the valve,
      logging that the valve is leaking,
      storing sensor data and the leak flow volume, and
      terminating the procedure; and
   e) if the computed time series of frequency magnitudes does not conform to the stored leak data set, terminating the procedure.

34. The method according to claim 33, wherein the flow volume through the valve is estimated from the pressures read by the inlet pressure sensor and an outlet pressure sensor, and by the position of the valve.

35. The method according to claim 33, further including, comparing sensed data of a compression load cell sensor for detecting the dynamic force applied on a valve spring washer with a predefined value, and if the compression load cell sensor data is out of acceptable range, generating a check movement message and a movement alarm.

36. The method according to claim 33, wherein the valve includes a microprocessor, the microprocessor initially being in a sleep mode, the microprocessor is activated either by detecting a certain level of vibration or by receiving a signal from a wake-up timer.

37. The method according to claim 33, further comprising communicating a message to an external system, the message being associated with one of the alarms, the logged pop, or the logged leaking valve.

38. A method for detecting operating conditions in a valve, the valve including an inlet and an outlet, a valve disc controlling fluid flow between the inlet and the outlet, a position sensor for detecting the position of the valve disc, a vibration sensor for detecting vibration in the valve disc, and an inlet pressure sensor for detecting the inlet pressure in the inlet, the method comprising:
   a) comparing the inlet pressure with a predefined value and, if the inlet pressure is above the predefined value, generating a valve-stuck alarm;
   b) computing a time series of frequency magnitudes for sensor data from the vibration sensor and inlet pressure sensor,
   c) comparing the computed time series of frequency magnitudes with a corresponding stored condition data set of time series of frequency magnitudes, and, if the computed time series of frequency magnitudes is outside of an acceptable range, generating a check-movement alarm,
   d) comparing the time series of frequency magnitudes with a corresponding stored pop data set of time series of frequency magnitudes reflecting a fast opening of the valve and, if the computed time series of frequency magnitudes conforms to the stored pop data set, developing a log that a pop has occurred; and
   e) comparing the time series of frequency magnitudes for the vibration sensor with a corresponding stored leak data set of time series of frequency magnitudes reflecting a leaky valve and, if the time series of frequency magnitudes for the vibration sensor conforms to the stored leak data set, developing a log that the valve is leaking.

39. The method according to claim 38, wherein, if the computed time series of frequency magnitudes conforms to the stored pop data set, estimating the flow volume through the valve and storing the flow volume.

40. The method according to claim 38, wherein, if the computed time series of frequency magnitudes for the vibration sensor conforms to the stored leak data set, estimating the leak flow volume through the valve and storing the leak flow volume.

41. The method according to claim 38, further comprising communicating a message to an external system, the message being associated with one of the alarms, the logged pop, or the logged leaking valve.

* * * * *